US007214047B2

(12) United States Patent
Weber

(10) Patent No.: US 7,214,047 B2
(45) Date of Patent: May 8, 2007

(54) CUTTING MACHINE FOR FOOD PRODUCTS

(75) Inventor: Günther Weber, Zachow (DE)

(73) Assignee: Weber Meachinenbau GmbH & Co. KG, Breidenbach (DE)

( * ) Notice: Subject to any disclaimer, the term of this patent is extended or adjusted under 35 U.S.C. 154(b) by 0 days.

(21) Appl. No.: 10/558,852

(22) PCT Filed: Mar. 31, 2004

(86) PCT No.: PCT/EP2004/003428

§ 371 (c)(1),
(2), (4) Date: Dec. 28, 2005

(87) PCT Pub. No.: WO2004/113034

PCT Pub. Date: Dec. 29, 2004

(65) Prior Publication Data

US 2006/0254402 A1 Nov. 16, 2006

(30) Foreign Application Priority Data

Jun. 17, 2003 (DE) ................................ 103 27 249

(51) Int. Cl.
*A21C 11/10* (2006.01)

(52) U.S. Cl. ................... 425/141; 425/302.1; 425/329; 425/143

(58) Field of Classification Search ........ 425/140–143, 425/329, 302.1
See application file for complete search history.

(56) References Cited

U.S. PATENT DOCUMENTS 1,958,144 A * 5/1934 Hutchinson ................. 425/296
3,080,831 A * 3/1963 Paitchell et al. ............ 425/329
3,711,231 A * 1/1973 Chess et al. ................ 425/127
3,853,443 A * 12/1974 Grillos ....................... 425/115
4,163,406 A 8/1979 Crawford ..................... 83/424
4,405,186 A 9/1983 Sandberg et al. ............. 414/21
4,731,008 A * 3/1988 Hayashi et al. ............. 425/335
5,770,242 A * 6/1998 Kuperman .............. 425/364 B
6,254,372 B1 * 7/2001 Morikawa et al. .......... 425/329

FOREIGN PATENT DOCUMENTS

| | | |
|---|---|---|
| DE | 28 51 683 | 6/1979 |
| DE | 689 07 060 | 7/1989 |
| DE | 196 26 511 | 1/1998 |
| DE | 202 10 501 | 10/2002 |
| EP | 0 260 946 | 9/1987 |
| EP | 0 412 835 | 8/1990 |
| EP | 0 931 630 | 7/1999 |
| GB | 2 386 317 | 9/2003 |

* cited by examiner

*Primary Examiner*—Robert Davis
*Assistant Examiner*—Marissa W. Chaet
(74) *Attorney, Agent, or Firm*—Gifford, Krass, Sprinkle, Anderson & Citkowski, P.C.

(57) ABSTRACT

The invention relates to a cutting machine for cutting up, in particular, foodstuff products having an unstable outer contour. The product feeding unit of the cutting machine has a number of conveyor and shaping belts, which are distributed over the peripheral contour of the product to be cut, are driven in a revolving manner, and whose conveyor strands can be, in particular, individually placed with a pre-determinable pressure against the conveyed product to be cut.

13 Claims, 3 Drawing Sheets

CUTTING MACHINE FOR FOOD PRODUCTS

CROSS-REFERENCE TO RELATED APPLICATIONS

This application is a National Stage of International Application No. PCT/EP2004/003428, filed Mar. 31, 2004, and which claims priority to German Patent Application No. 103 27 249.6, filed Jun. 17, 2003. The disclosures of these applications are incorporated herein by reference.

FIELD OF THE INVENTION

The invention relates to a cutting machine for the slicing of food products, in particular having an unstable outer contour, and the like, comprising at least one cutting head having a drive unit and having circular knives or scythe-like knives revolving in a planetary manner in a cutting plane as well as at least one product supply unit having devices holding the product to be cut, guiding it and pushing it forward to the cutting plane.

BACKGROUND OF THE INVENTION

Cutting machines of this type, which are also called slicers and operate at comparatively high cutting speeds, are generally known. With these known cutting machines or slicers, the product to be cut is usually supplied to the cutting plane lying on a transport belt, with a further transport belt being able to be provided for the improvement of the product guidance which acts on the product to be cut from above.

To take account of the particular problems in the cutting of products, in particular soft and yielding products, and to ensure a slicing of these products which is as perfect as possible, it is customary to slice the products in a very cooled or frozen state.

Products to be cut which are so sensitive should not be frozen where possible, since the quality of the products can be impaired by the process of freezing which is frequently carried out too slowly and not always in a perfect shock freezing manner.

To avoid these problems, attempts have already been made to supply sensitive products of this type through a tube and to effect the feed by pressure exerted from the rear. However, this procedure has not proven itself since the peripheral contours of the product to be cut can be very different, which can result in strong—and also uncontrolled—product deformations in the respective supply tube which can lead to product impairment.

SUMMARY OF THE INVENTION

It is therefore the object of the invention to design a cutting machine of the initially named type such that a problem-free supply of product to be cut, in particular sensitive product to be cut, to the cutting plane can be ensured in the plus temperature range, and indeed at least largely independently of the respective outer contour of the product to be cut.

This object is substantially satisfied in accordance with the invention in that the product supply unit includes a plurality of transport and shaping belts which are arranged distributed over the peripheral contour of the product to be cut, are driven directly or indirectly in a revolving manner and whose conveyor runs can in particular be set individually against the transported product to be cut with a pre-settable pressure.

It is possible by the use of a plurality of narrow transport and shaping belts to ensure a supply guided on all sides of product to be cut to the cutting plane which is otherwise difficult to handle and to simultaneously achieve such products, which have an unstable outer contour, being able to be brought into a largely defined cross-sectional shape, which likewise has a positive effect on the cutting process. Any damage to or impairment of the products is avoided by this type of product supply, since perfect cuts can be carried out at temperatures of the product to be cut located in the plus range due to the product guidance at all sides.

The transport and shaping belts are preferably supported in a manner such that they can be matched to the respective product to be cut with respect to their effective position, i.e. they are not only adjustable transversely to the conveying direction, but also angle-wise.

A particularly advantageous embodiment of the invention consists of devices being provided for the sensing of the setting positions of the transport and shaping belts and of being able to determine at least approximate values from the position values obtained, but preferably substantially precise values with respect to the majority of the transport and shaping belts used, for the current peripheral contour or for the cross-sectional surface of the product to be cut in the region of the cutting plane so that influence can in turn be taken on the slice thickness from this information in order to achieve the respective desired weight or to approach this desired weight as best as possible. In this connection, a sensor system is preferably used for the sensing of the current temperature of the product to be cut since the compressibility of the respective product to be cut is also dependent to a large part on the temperature of the product to be cut. Due to the sensing of the temperature of the product to be cut, correction factors based on experience values can be taken into account in the respective determination of the cross-sectional surface of the product to be cut, which—in connection with the achieving of a desired weight per slice which is as precise as possible—permits a substantial increase in precision.

The correction factors are standardized to a reference value, for example to the value of 0° C. and the surface values determined for the respective cross-section are further processed in accordance with a stored table of correction values with additions or deductions in dependence on the number of degrees by which the temperature of the product to be cut lies above or below the reference value.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
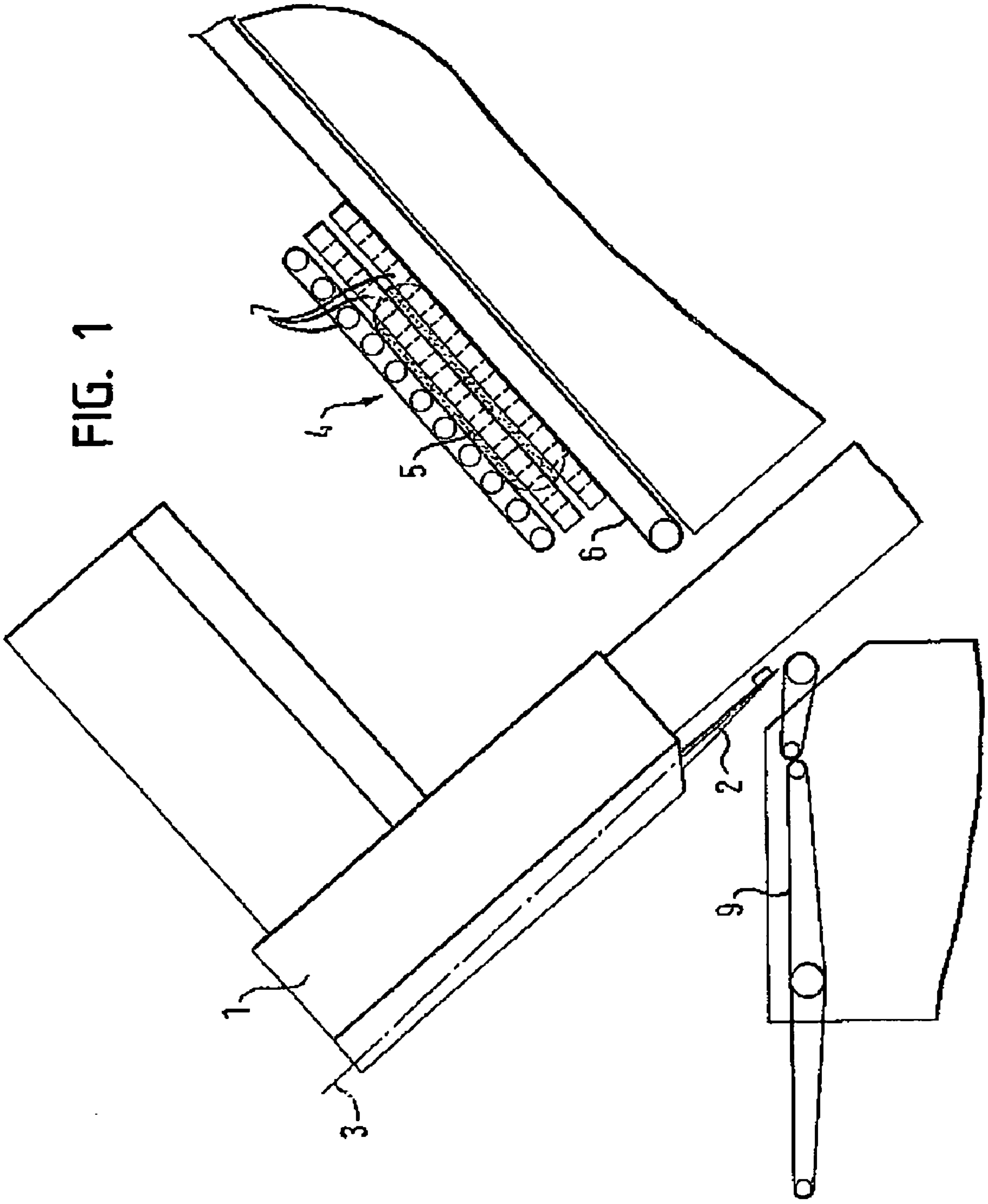
FIG. 1 is a very schematic side view of an embodiment of a cutting machine in accordance with the invention.

FIG. 1 shows a cutting machine comprising a cutting head 1 including the drive unit and having a cutting knife 2 revolving in front of the product supply unit 4 in the cutting plane 3. The slices cut off by means of the knife 2 fall onto a removal unit 9 in the usual manner.

The design of the product supply unit 4 by means of which the respective product 5 to be cut is supplied to the cutting plane 3 is material within the framework of the present invention.

This product supply unit 4 includes a support belt 6 for the product 5 to be cut provided with a corresponding support surface as a rule.

A plurality of transport and shaping belts 7, which are arranged distributed around the product 5 to be cut and which can be set against the product 5 to be cut with a pre-settable pressure, are associated with the support belt 6 conveying the product 5 to be cut to the cutting plane 3. At least some of these transport and shaping belts are provided with a drive of their own and consist of narrow, band-like belts, in particular profiled belts, which, due to their pressing, have a shaping effect with respect to the product to be cut which is inherently yielding and which change the product to be cut into a product with a substantially defined outer contour.

Figure 2:
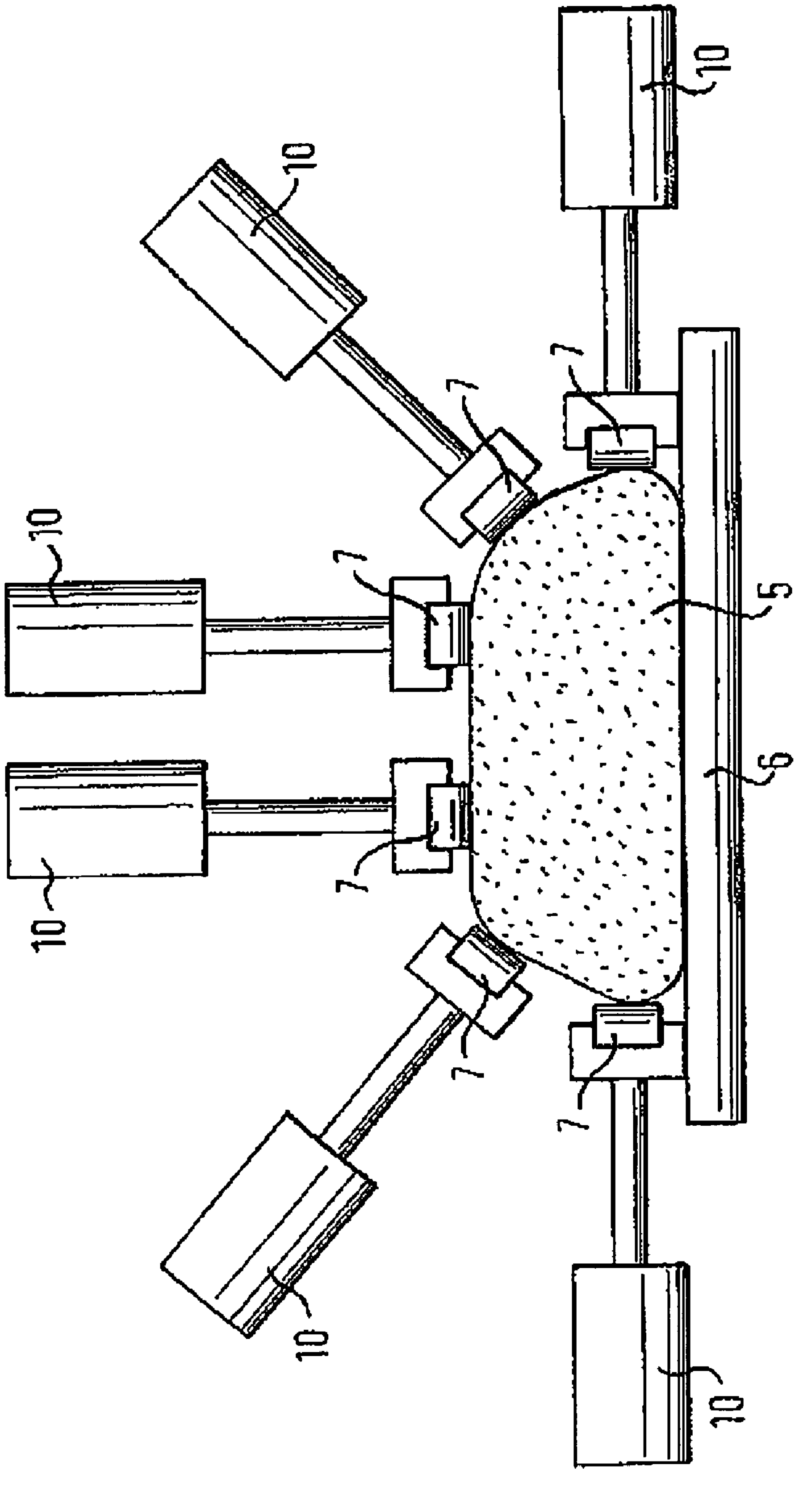
FIG. 2 is a schematic front view of the product supply device seen from the cutting plane.

It can be recognized in the end view in accordance with FIG. 2 that the number of transport and shaping belts 7 can essentially be selected freely; however, a good surrounding of the respective product 5 to be cut is always aimed for so that, as a rule, approximately six to eight transport and shaping belts of this type are provided.

The pressing force generated by a setting unit 10 can be selected freely in dependence on the respective product to be cut, and indeed both in a manner such that the individual transport and shaping belts are acted on by equal pressures and in a manner such that different pressing forces are selected. It is possible by the selection of different contact pressures or by a different adjustment of the transport and shaping belts in the direction of the product 5 to be cut to pre-set specific desired peripheral contours of the yielding product to be cut, with the respective peripheral contour of the product 5 to be cut being able to be determined without problem from the respective known end positions of the transport and shaping belts so that, with knowledge of the peripheral contour or of the cross-sectional surface of the product to be sliced, the thickness of the slices to be cut off can be directly influenced in each case. This also permits the relatively precise observation of pre-set desired weights with critical products of this type.

Figure 3:
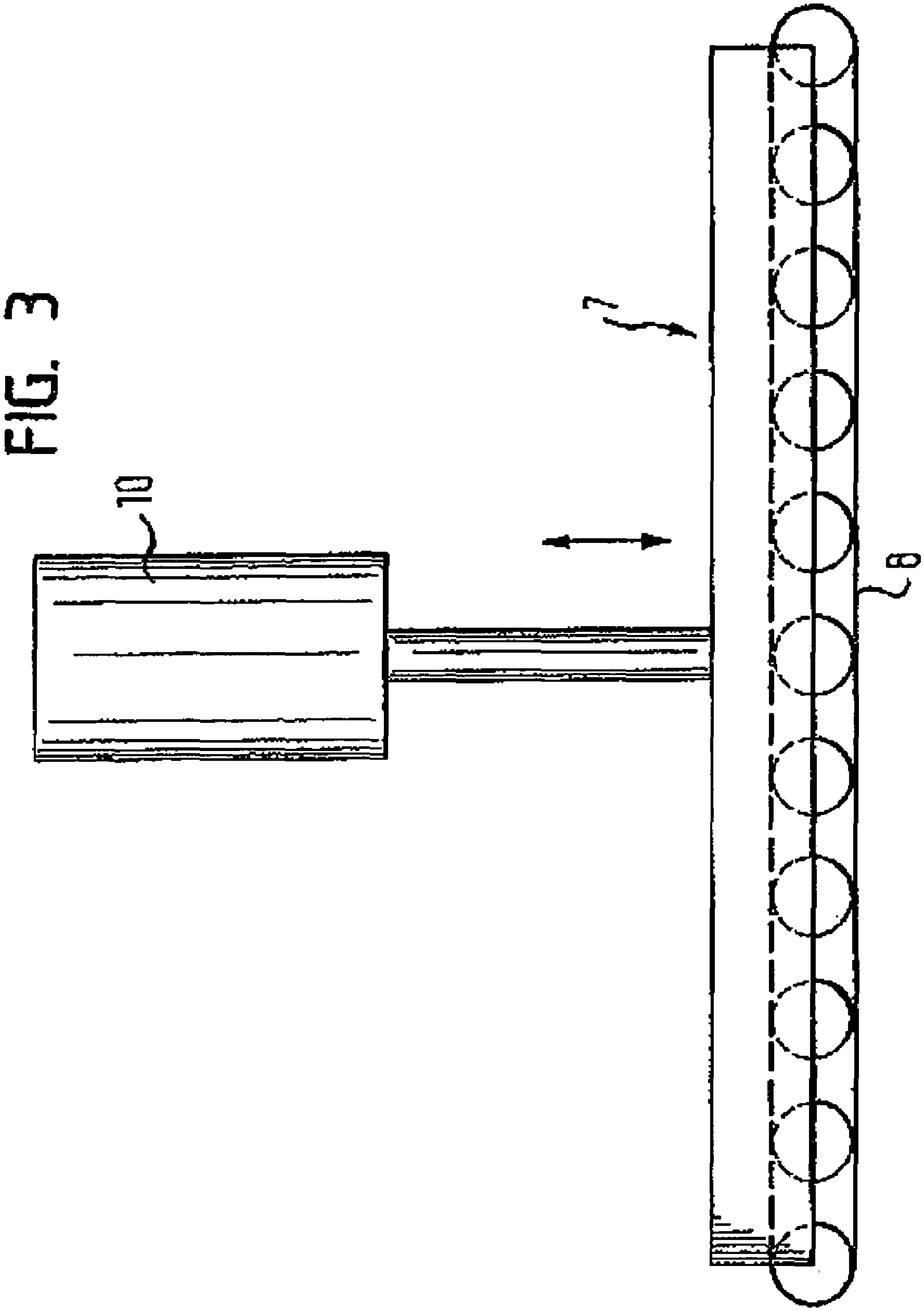
FIG. 3 is a schematic representation of an example of a transport and shaping belt with associated actuation device.

FIG. 3 shows an example of a transport and shaping belt with associated setting unit 10. The transport belt guided by rollers provided at the end side is connected via a support construction to the setting unit 10, which is in particular hydraulically or pneumatically actuable and is attached fixed to the housing, and thus ensures a setting movement of the transport and shaping belt 7 with respect to the respective product 5 to be cut pre-settable in a defined manner. The conveyor run 8 of the transport and shaping belt 7 is preferably supported over its length, preferably via individual rollers.

In all embodiment variants of the invention, a sensor system for the sensing of the temperature of the product to be cut can be used to increase the precision of the desired weights of the individual cut-off slices which makes it possible—while taking account of experience values preferably recorded in table form for the respective products, on the one hand, and the temperatures of the products to be cut, on the other hand—to take account of correction factors in the determination of the cross-sectional surface and thus in the determination of the weight.

The description of the invention is merely exemplary in nature and, thus, variations that do not depart from the gist of the invention are intended to be within the scope of the invention. Such variations are not to be regarded as a departure from the spirit and scope of the invention.

The invention claimed is:

1. A cutting machine for the slicing of food products, in particular having an unstable outer contour, comprising:

at least one cutting head (1) having a drive unit;

knives (2) that revolve in a planetary manner in a cutting plane (3); and at least one product supply unit (4) having devices (6, 7) for holding a product (5) to be cut, guiding said product (5) and pushing said product (5) forward to the cutting plane (3), wherein the product supply unit (4) includes a plurality of transport and shaping belts (7) that are distributed over a peripheral contour of the product (5) and that are driven in a revolving manner, and includes conveyor runs (8) that can be set individually against the transported product (5) with a pre-settable pressure.

2. A cutting machine in accordance with claim 1, wherein said knives (2) include at least one of circular knives and scythe-like knives.

3. A cutting machine in accordance with claim 1, wherein the transport and shaping belts (7) consist at least in part of narrow, band-like belts.

4. A cutting machine in accordance with claim 1, wherein support belts (6) serve to support the product and are wider than the transport and shaping belts (7) that are distributed over a remaining peripheral contour of the product.

5. A cutting machine in accordance with claim 1, wherein the conveyor runs (8) of the support belt (6) facing the product (5) are guided over a stationary support surface extending perpendicular to the cutting plane (3).

6. A cutting machine in accordance with claim 1, wherein at least some of the transport and shaping belts (7) are angle-wise adjustably supported via the peripheral contour of the product (5) to be cut.

7. A cutting machine in accordance with claim 1, wherein the conveyor runs (8) of the individual transport and shaping belts (7) can be set against the product (5) with different pressures.

8. A cutting machine in accordance with claim 1, wherein devices are provided for sensing at least one of setting positions and contact pressures exerted by the conveyor runs (8) of the transport and shaping belts (7) on the product (5) and wherein at least approximate values for the current peripheral contour of the product (5) in a region of the cutting plane (3) can be determined from the measured values obtained.

9. A cutting machine in accordance with claim 8, wherein setting a slice thickness occurs while taking a target slice weight into account in dependence on the peripheral contour of the product and determined via the sensed measurement signals of the transport and shaping belts (7).

10. A cutting machine in accordance with claim 8, wherein a sensor system is provided for sensing a current temperature of the product (5), and wherein one of a positive and a negative correction factor is taken into account in dependence on a temperature of the product upon determining one of the peripheral contour of the product and the cross-sectional surface of the product.

11. A cutting machine in accordance with claim 10, wherein the correction factors are standardized to a reference temperature value, in particular to 0° C.

12. A cutting machine in accordance with claim 1, wherein the transport and shaping belts (7) are adjustable relative to one another with respect to at least one of their mutual spacing, their angular spacing and their inclination toward an axis of product supply.

13. A cutting machine in accordance with claim 1, wherein the conveyor runs (8) of the transport and shaping belts (7) are supported in a manner such that they have an at least substantially planar contour.

* * * * *